United States Patent Office 3,333,179
Patented July 25, 1967

3,333,179
PARALLEL INVERTER HAVING HIGHER FREQUENCY AT START-UP
William H. Freeman, Glenview, Ill., assignor to Jefferson Electric Company, Bellwood, Ill., a corporation of Delaware
Filed May 12, 1964, Ser. No. 366,772
9 Claims. (Cl. 321—45)

ABSTRACT OF THE DISCLOSURE

A DC to AC inverter includes a transformer comprising a primary winding, a load secondary winding and a saturable core. A two leg parallel commutating circuit is connected between the ends of the primary and the negative DC lead and includes an SCR in each leg. Trigger means for the SCR's includes a unijunction pulser having an RC charging circuit which includes a main and a shunt resistance. An emitter follower circuit is connected to the emitter of the unijunction transistor through the shunt resistance to cut the shunt resistance out of the RC charging circuit and reduce the frequency after start-up. The transformer, in addition to the load secondary, also includes a condenser winding to provide core saturation during normal operation. A slow acting relay is provided to cut out the condenser winding at start-up, and a slower acting relay is provided to cut out the load during start-up.

---

The present invention relates to a parallel type inverter for converting DC to AC, and in which the load is energized by a secondary winding inductively arranged with respect to the commutating winding, or primary.

Circuits of this type present a start-up problem. This is due to the fact that the transformer core which couples the two windings may become saturated during the first half cycle. If this occurs the circuit will not commutate. Such saturation is believed to be due to residual magnetism in the core at the time of start-up. When this occurs it is necessary to disconnect the DC input and again close the input circuit, and this may have to be repeated several times before the device begins to commutate. Also, there is a danger that both of the SCR's may be overloaded during the noncommutating period.

It is an object of this invention to overcome this difficulty to the end that the inverter will start commutating immediately thus providing consistently reliable operation.

According to my invention, I avoid saturation by operating the inverter at a higher frequency for the first few cycles of operation. This is accomplished by increasing the frequency of the pulsing circuit of the trigger device.

The usual trigger device for an inverter comprises a unijunction pulser or relaxation oscillator of which the RC constant determines the operating frequency. According to my invention, I provide means for automatically providing a decreased resistive component of the RC charging circuit at the time of start-up, and for increasing said resistive component after the first few cycles.

A further object is to provide improved means for accomplishing the aforementioned change in frequency without the use of switching mechanism that calls for synchronous operation.

Another object is to provide an inverter having improved regulation (voltage stability) so that the inverter can serve as a general purpose AC power supply for all loads up to its rated load capacity and of a wide variation in power factor.

Still another object is to provide an improved inverter which embodies economical design of the magnetic circuit thus contributing to minimal weight. In a sense, this objective is incompatible with consistently reliable start-up for the reason that economical core design accentuates the saturation phenomenon at start-up, but according to my invention both objectives are obtained in a single device.

A still further object of my invention is to provide a parallel type inverter embodying frequency variation at start-up in which the secondary circuit is not adversely affected by frequency variation.

Other objects, features and advantages will become apparent as the description proceeds.

With reference now to the drawings in which like reference numerals designate like parts:

FIG. 5 shows a modification.

Figure 1:
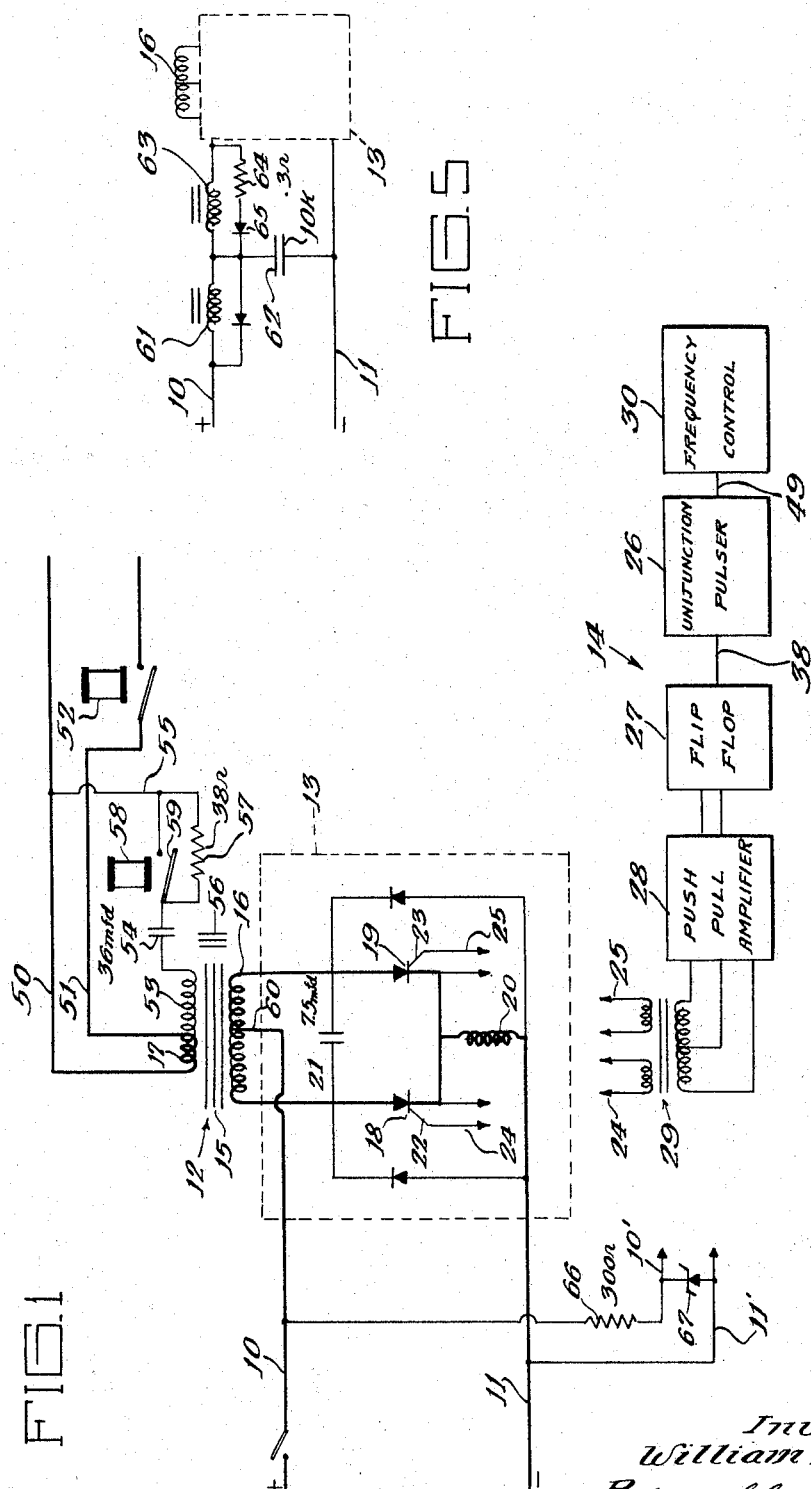
FIG. 1 is an electrical diagram showing a preferred embodiment of my invention.

In FIG. 1, the reference numerals 10 and 11 indicate positive and negative leads respectively, adapted for connection to a suitable DC source. The embodiment shown is designed to convert 70 volts DC to 120 volts AC, and has a load capacity of 1 kilowatt.

The converter comprises a load transformer 12, a parallel SCR commutating circuit 13, and a trigger device 14.

The load transformer 12 comprises a core structure 15 (FIG. 4) on which is mounted a primary winding 16 and a secondary winding 17.

The commutating circuit 13 comprises a first SCR (silicon controlled rectifier) 18 and a second SCR 19 which are connected in parallel with each other between the primary winding 16 and the negative lead 11, through a common inductance 20. A commutating condenser 21 is connected across the ends of the primary winding 16, as shown.

The particular commutating circuit shown is the McMurray-Bedford circuit described in detail at pages 152 to 154 of the publication "Silicon Controlled Rectifier Manual, Second Edition" published by General Electric Company, Rectifier Components Department, W. Genesee St., Auburn, New York, copyright 1961.

The gates 22 and 23 of SCR's 18 and 19 respectively, have gate leads 24 and 25 respectively.

The trigger device 14 comprises a unijunction pulser 26 which feeds into a flip-flop 27, and from there into a push-pull amplifier 28 which is inductively coupled to the gate leads 24 and 25 at 29. The arrangement is designed to provide a square wave trigger signal at each gate 22, 23, in an alternate manner, so as to render the SCRs alternately conducting, the flip-flop 7 and push-pull amplifier 28 contributing to the square wave shape.

The frequency of the trigger device is controlled in the manner previously pointed out by a frequency control circuit 30 which is connected to the unijunction pulser 26, Branch DC leads 10' and 11' provide power for the operation of components 26, 27, 28 and 30; a resistance 66 and zener diode 67 maintain a 24 volt power supply.

Figure 2:
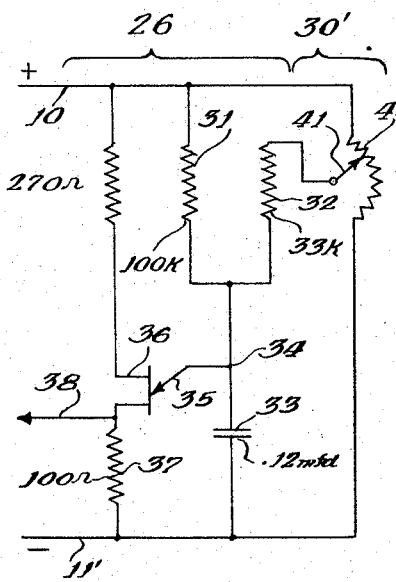
FIG. 2 is a diagram illustrating the unijunction pulser and the operation of the frequency control circuit.

As shown in FIG. 2, the unijunction pulser 26 comprises an RC charging circuit 31–32–33 connected across power leads 10' and 11'. The resistive component of the RC charging circuit comprises a main resistance 31 and a shunt resistance 32. These are connected in series with a condenser 33. A junction point 34 located between the parallel resistances 31–32 and condenser 33 is connected to the emitter 35 of a unijunction transistor 36, the latter also being connected across power leads 10'–11'. When the potential of junction point 34 reaches the break-over point of the unijunction transistor 36, the condenser 33 discharges through resistance 37 to the negative line 11', and transmits a positive pulse to the flip-flop 27 through lead 38. In other words, the unijunction pulser 36 is a relaxation oscillator circuit.

The positive end of the main resistance 31 is connected directly to the positive lead 10', as shown, but means are provided for regulating the potential applied to the positive end of the shunt resistance 32. Thus, the effective resistance provided by shunt resistance 32 may be regulated, and this in turn controls the charging rate of the RC charging circuit 31–32–33.

The operation is illustrated in FIG. 2 in which a potentiometer 40 is connected between leads 10'–11', the slide 41 of the potentiometer being connected to the positive end of the shunt resistance 32.

Figure 3:
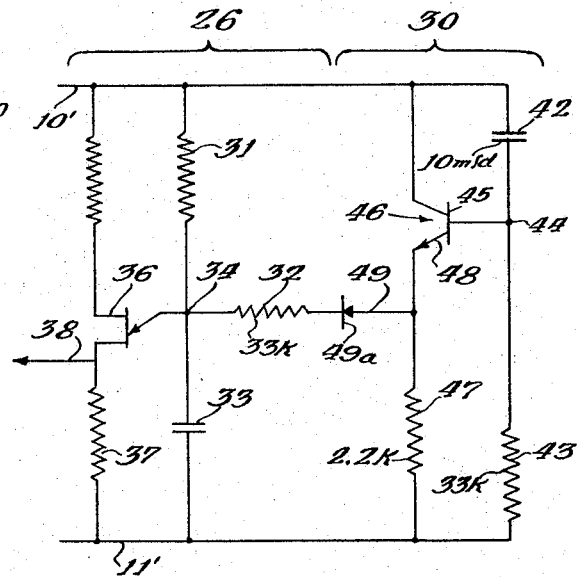
FIG. 3 is a diagram similar to FIG. 2 but showing a preferred form of the frequency control circuit.

The preferred arrangement of the frequency control circuit 30 is shown in FIG. 3, and comprises an emitter follower circuit the action of which is controlled by charging circuit 42–43. A junction point 44 between the condenser 42 and resistance 43 is connected to the base 45 of a transistor 46, the latter being connected across leads 10' and 11'. The values of condenser 42 and resistance 43 are selected to provide a time constant of from $\frac{1}{10}$ to $\frac{1}{2}$ second, with the result that the potential of the emitter 48 of the transistor 46 will gradually decrease from 24 volts downwardly to zero volts. The emitter 48 is connected to the positive end of the shunt resistance 32 by a lead 49. A blocking diode 49a is interposed in the lead 49 to prevent reverse discharge of the pulser condenser 33.

In effect, therefore, the frequency control circuit 30 operates to cut the shunt resistance 32 out of the RC charging circuit 31–32–33, so that the trigger pulse frequency will be determined only by the main resistance 31 and the condenser 33. The values of these components are selected to provide a time constant of $\frac{1}{120}$ of a second for a 60 cycle output. This value will be somewhere between 100 kilo-ohms and 130 kilo-ohms for a condenser of 0.12 mfd. Suitable means are provided for trimming the resistance value in accordance with the particular conditions.

The shunt resistance 32 has a value such that the initial frequency of the unijunction pulser 26 is somewhat more than twice the steady state operating frequency of 120 pulses per second. In the example shown, the value is 33 kilo-ohms which will give an initial frequency of somewhere between 300 and 600 pulses per second, corresponding to an initial output frequency of from 150 to 300 cycles per second.

The advantage of the particular arrangement shown, as contrasted with the use of a cut-out switch, is that this arrangement avoids the problem of synchronizing the switch actuation with the inter-pulse interval. In other words, a continuous succession of pulses is provided, and the frequency is gradually decreased from an initial frequency in excess of 300 down to an operating frequency of 120, and this slide down of the frequency takes place within a fraction of a second.

As shown in FIG. 1, AC output leads 50–51 are connected to the load secondary 17. Due to the fact that the AC load may be sensitive to changes in frequency, means are provided to cut in the load after the frequency of the converter has been brought down to steady state, or operating frequency. To this end, a slow acting relay 52 is provided of which the biased open contacts are disposed in the lead 51, and the winding of the relay 52 may be connected across either the DC leads 10–11, or the AC leads 50–51. The slow operating relay 52 is preferably timed so that the load will be cut in in two seconds after the DC circuit is closed.

It is an object of the present invention to provide an inverter having improved regulation (voltage stability) and to this end, I provide an extended secondary winding 53. A condenser 54 is connected across both windings 17, 53, by means of leads 50 and 55.

The transformer 12 is a leakage reactance transformer in which the windings 16 and 17 are spaced from each other so as to provide a leakage path therebetween, and magnetic shunts 56 are preferably disposed between the windings to provide the desired leakage. The combination of the leakage reactance and the condenser circuit 17–53–54 causes the secondary portion of the core 15 to operate above the knee of the saturation curve, say at 120,000 lines per square inch, the flux density in the primary core portion being from 90,000 to 100,000 lines. It is this combination of saturation and the condenser circuit that provides the desired voltage stability, and which adapts my inverter for general purpose use, for all loads up to the rated load capacity and irrespective of power factor.

Inasmuch as the LC relationship at 60 cycles approaches a resonant condition, as the frequency varies initially from 150 or more cycles down to 60 cycles, there is likely to be a voltage surge in the condenser winding corresponding to the resonant frequency. To prevent this, I include in the condenser circuit 17–53–54, which normally draws about 8 amperes at 60 cycles, a resistance 57 so as to provide a low Q circuit during start-up. This resistance 57 is located in the lead 55, and slow operating relay means 58 is provided to short out this resistance after operating frequency has been attained, such as one second, and prior to the time that the load is cut in. Thus, the contacts 59 of the relay 58 are connected in parallel across the resistance 57. The winding 58 of the relay is preferably connected across the DC leads 10 and 11 so as to assure consistent operation with respect to time delay.

As previously pointed out, a parallel inverter of this type is particularly susceptible to starting troubles due to residual magnetism. Therefore, the provision of a trigger device which embodies a higher start-up frequency according to my invention is particularly well adapted for use in an inverter having a voltage stabilized load transformer.

Figure 4:
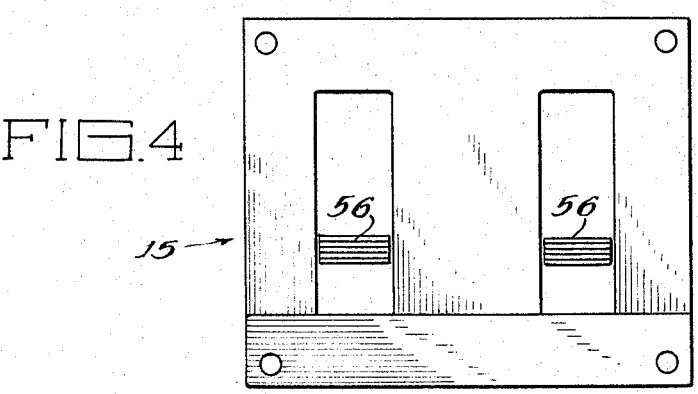
FIG. 4 is a plan view showing the core structure of the load transformer.

The core, as shown in FIG. 4, is about 7½ inches long and 9 inches wide, and is made up of E I laminations, of about the proportions shown, stacked 3 inches high. The winding leg has an area of substantially 8.8 square inches. The laminations are made of grain oriented silicon steel, 29 gauge.

The winding specifications are as follows:

| Winding | Turns | Volts |
|---|---|---|
| Primary 16 | 76 | 140 |
| Secondary 17 | 43 | 120 |
| Secondary 53 | 175 | 480 |
| Secondaries 17 and 53 | 218 | 600 |

The primary winding 16 has a center tap 60, at 38 turns, to which the positive lead 10 is connected, the voltage across either half being substantially 70 volts.

FIG. 5 shows a modification in which the inductance 61 (5 millihenries) and condenser 62 provide a filter for absorbing any ripple or irregularity due to commutation of the inverter, which would otherwise be fed back along the DC line 10–11.

A second inductance 63 (100 microhenries) is provided for modulating any extremely high current surges which might otherwise occur at each commutation. Also it prevents voltage surges having a very fast rise from appearing across that SCR which is in the blocking state, and which might otherwise occur due to the inherent leakage reactance of the primary winding. The inductance 63 thus permits the use of a lower rating SCR. In both instances feed back diodes are provided, and in the case of inductance 63, a resistance 64 is connected in series with the diode 65 to prevent overheating thereof.

Exemplary values are indicated in the drawings, the symbol K designating kilo-ohms. The inductance 20 is 50 microhenries.

Although only a preferred embodiment of my invention has been shown and described herein, it will be understood that various modifications and changes may be made in the construction shown without departing from the spirit of my invention as pointed out in the appended claims.

I claim:

1. An inverter device for connection across DC leads comprising a transformer having a primary winding, a secondary winding, and a core structure magnetically linking said windings, the mid-point of said primary being connected to a positive DC lead, a parallel commutating circuit having two legs and being connected between the ends of said primary winding and a negative DC lead and including in each leg thereof an SCR, trigger means for alternately applying pulses to the gates of said SCR's for operating said inverter at a predetermined operating frequency, and means for increasing the frequency of the pulses supplied by said trigger means to said gates at the time of start-up, said transformer being a leakage reactance transformer which includes an extended secondary winding connected in series with said first mentioned secondary winding, a condenser connected across both of said secondary windings to provide a condenser circuit, the cross section of said core being such that the secondary portion thereof operates in the saturation range when a resistive load approaching rated capacity is connected across said first mentioned secondary, resistance means connected in series in said condenser circuit, contact means shunting out said resistance means to provide a high Q circuit at rated output frequency, and a slow acting relay for actuating said contact means into closed position after the frequency of said trigger means is stabilized at said predetermined operating frequency.

2. An inverter device as claimed in claim 1 which includes output leads connected to said first mentioned secondary winding, and a second slow acting relay having its contacts connected in series with one of said output leads so that said first mentioned secondary winding will not be energized until after actuation of said first mentioned slow acting relay.

3. An inverter device for connection across DC leads comprising a transformer having a primary winding, a secondary winding, and a core structure magnetically linking said windings, the mid-point of said primary being connected to a positive DC lead, a parallel commutating circuit having two legs and being connected between the ends of said primary winding and a negative DC lead and including in each leg thereof an SCR, means for alternately applying pulses to the gates of said SCR's at the time of start-up at an initial pulse frequency which corresponds to more than twice the rated output frequency of said inverter, means for reducing said pulse frequency after start-up to a normal rate which corresponds to the rated output frequency, an inductance 20 common to both legs of said parallel commutating circuit and connected between said SCR's and said negative DC lead, a second inductance 63 connected in said positive DC lead and in series with said primary mid-point, and a feed back diode 65 connected around said second inductance and in parallel therewith.

4. An inverter device as claimed in claim 3 which includes a low pass filter connected across said leads ahead of said second inductance.

5. An inverter device for connection across DC leads comprising a transformer having a primary winding, a secondary winding, and a core structure magnetically linking said windings, the mid-point of said primary being connected to a positive DC lead, a parallel commutating circuit having two legs and being connected between the ends of said primary winding and a negative DC lead and including in each leg thereof an SCR, trigger means for alternately applying pulses to gates of said SCR's for operating said inverter at a predetermined operating frequency, said trigger means including a unijunction pulser having an RC charging circuit which includes as the resistive component thereof a main resistance and a shunt resistance, and frequency control means for regulating the effective value of said shunt resistance at the time of start-up.

6. An inverter device as claimed in claim 5 in which said frequency control means includes means for regulating the potential applied to the positive end of said shunt resistance.

7. An inverter device as claimed in claim 5 in which said frequency control means includes a second RC charging circuit, an emitter follower transistor, means connecting said second RC charging circuit to the base of said transistor, and a connection between the emitter of said transistor and positive end of said shunt resistance.

8. An inverter device as claimed in claim 7 in which said last mentioned connection includes a forwardly facing diode.

9. An inverter device as claimed in claim 7 in which the time constant of said second RC charging circuit is between $\frac{1}{10}$ and $\frac{1}{2}$ of a second.

References Cited

UNITED STATES PATENTS

| 3,075,136 | 1/1963 | Jones | 321—45 |
|---|---|---|---|
| 3,133,241 | 5/1964 | White | 321—45 |
| 3,172,060 | 3/1965 | Jensen. | |
| 3,264,548 | 8/1966 | King | 321—45 |
| 3,273,046 | 9/1966 | Bedford | 321—45 |

JOHN F. COUCH, *Primary Examiner.*

W. M. SHOOP, *Assistant Examiner.*